United States Patent
Thoma et al.

(10) Patent No.: US 6,767,469 B1
(45) Date of Patent: Jul. 27, 2004

(54) SEPARATIONS METHOD FOR POLAR MOLECULES

(75) Inventors: Steven G. Thoma, Albuquerque, NM (US); Francois R. Bonhomme, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 127 days.

(21) Appl. No.: 10/175,215

(22) Filed: Jun. 18, 2002

(51) Int. Cl.[7] .............................................. B01D 15/00
(52) U.S. Cl. ..................... 210/670; 210/679; 210/690; 210/691; 210/908
(58) Field of Search ................................ 210/670, 679, 210/690, 691, 908

(56) References Cited

U.S. PATENT DOCUMENTS

| | | | |
|---|---|---|---|
| 5,527,981 A | 6/1996 | Valyocsik | 585/820 |
| 5,705,078 A * | 1/1998 | Kurek et al. | 210/759 |
| 5,980,749 A | 11/1999 | Rendina | 210/633 |
| 6,190,562 B1 * | 2/2001 | Kulprathipanja et al. | 210/670 |
| 6,391,823 B1 | 5/2002 | O'Hare et al. | 502/414 |

* cited by examiner

Primary Examiner—Ivars C. Cintins
(74) Attorney, Agent, or Firm—Elmer A. Klavetter

(57) ABSTRACT

A method for separating at least one compound from a liquid mixture containing different compounds where a new crystalline manganese phosphate composition with the formula $Mn_3(PO_4)_4 \cdot 2(H_3NCH_2CH_2)_3N \cdot 6(H_2O)$ is dispersed in the liquid mixture, selectively intercalating one or more compounds into the crystalline structure of the $Mn_3(PO_4)_4 \cdot 2(H_3NCH_2CH_2)_3N \cdot 6(H_2O)$.

19 Claims, 2 Drawing Sheets

SEPARATIONS METHOD FOR POLAR MOLECULES

RELATED APPLICATIONS

Ser. No. 10/174,685, entitled "Templated, Layered Manganese Phosphate," filed Jun. 18, 2002, assigned to the same assignee as that of the present invention and fully incorporated herein by reference.

This invention was made with Government support under Contract No. DE-AC04-94AL85000 awarded by the Department of Energy. The Government has certain rights in the invention.

BACKGROUND OF THE INVENTION

The invention describes a method for separating polar molecules in a liquid solution and, more particularly, a method for separating polar molecules in a liquid solution using $Mn_3(PO_4)_4 \cdot 2(H_3NCH_2CH_2)_3N \cdot 6(H_2O)$.

Methods for separating compounds from mixtures are of great utility, both on a laboratory and industrial scale. The purity of produced chemical compounds is dictated to a large extent by the purification, or separations, step in which a compound is separated from other compounds in a mixture. Separation of a compound from chemically-related compounds can be particularly difficult to achieve. Conventional methods for separating a compound from related compounds use differences in these compounds that are both chemical and physical. Porous inorganic and organic solids have shown utility as separations media for various industrial applications. The microstructure of these solids allows molecular access to the surface area that enhances their sorption utility. These porous solids can be amorphous or crystalline and can be inorganic, such as aluminosilicate materials, or can be inorganic/organic hybrids, such as organically templated materials. Solid crystalline compounds can be formed that are useful in separations because of their pore size distribution structure or because of the characteristics of the layering in the structure.

Various organo-metal phosphate materials have been formed which have sorption characteristics that serve to selectively separate one compound from a mixture. These materials accomplish separation using a combination of chemical and physical characteristics. The crystalline structure can provide layering that selectively permits intercalation of certain molecules from a mixture of molecules with the organo-metal phosphate also having sorption characteristics that aid in separations.

Metal-phosphate materials have been formed as crystalline structures, generally by hydrothermal synthesis. Organo-metal phosphate materials have been formed using a variety of organic compounds as the templating molecule. Alumino-phosphate, tin-phosphate, and gallium-phosphate compounds using tris(2-aminoethyl)amine (TREN) as the organic template have been formulated, with different structures and potentially different separations applications because of those structural differences.

Any improvement in the degree of selectivity or efficiency of a separation process can lead to increased purity of a product and, potentially, significant cost savings. The present invention provides a separation process using a novel manganese-phosphate compound templated using TREN which can selectively separate certain polar compounds from a mixture of chemically-similar polar compounds.

DESCRIPTION OF SPECIFIC EMBODIMENTS

Figure 1:
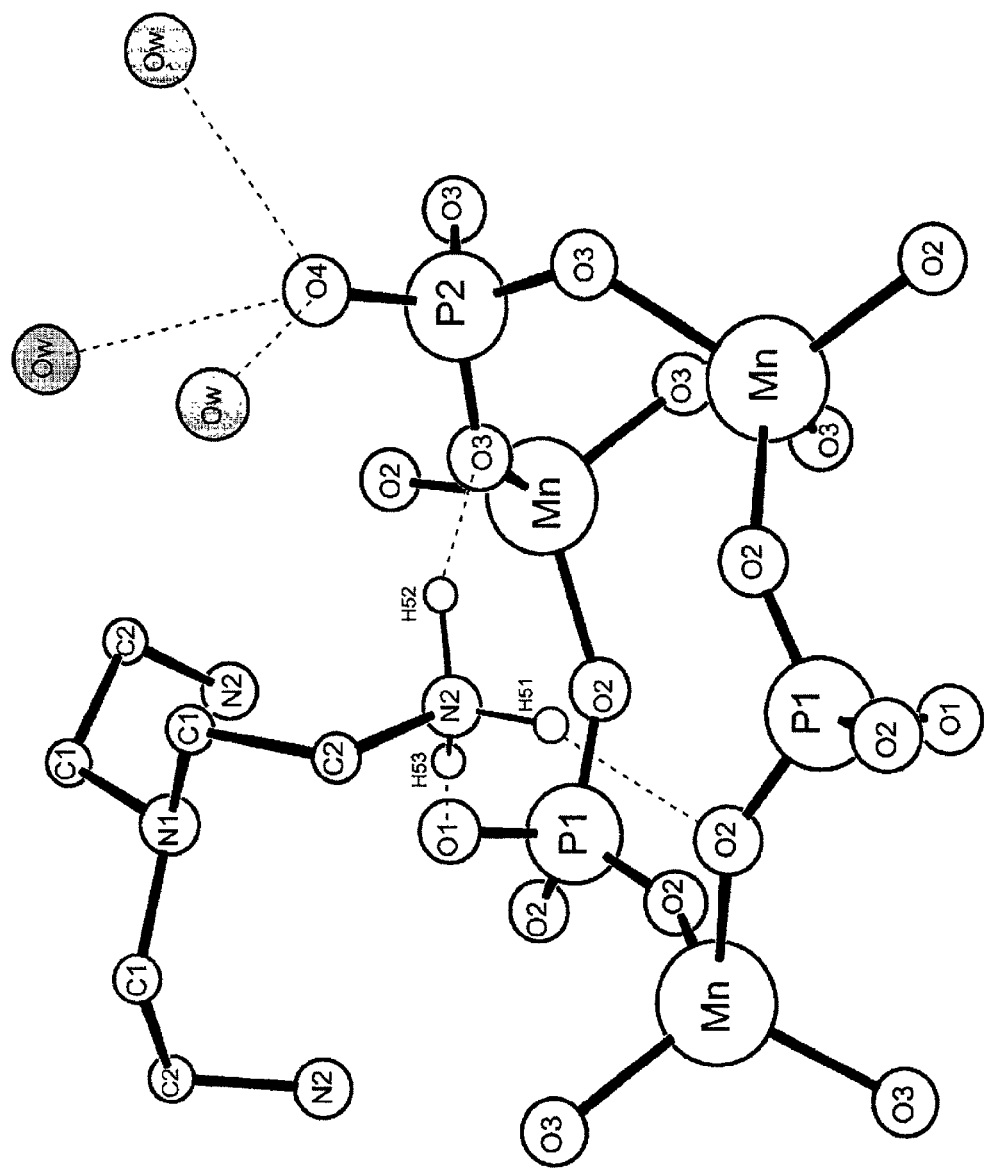
FIG. 1 shows an illustration of the structure of the composition of $Mn_3(PO_4)_4 \cdot 2(H_3NCH_2CH_2)_3N \cdot 6(H_2O)$.

The present invention relates to a method of separating at least one polar compound from a mixture of polar compounds using a crystalline manganese phosphate composition. The manganese-phosphate composition has an empirical chemical composition on a hydrated basis expressed by the formula

$Mn_3(PO_4)_4 \cdot 2(H_3NCH_2CH_2)_3N \cdot 6(H_2O)$.

The composition is a layered manganese phosphate compound that is synthesized solvothermally or hydrothermally using tris(2-aminoethyl)amine (TREN) as the organic template. By a layered compound, it is meant that the compound is a crystalline material with atoms in the two-dimensional layers are cross-linked by chemical bonds, while the atoms of adjacent layers (in the third dimension) interact by physical forces only. A single layer is called a lamella or sheet. Each layer of the compound of the present invention comprises two-dimensional sheets of manganese phosphate that are sandwiched between a particular organic compound (that is, TREN). These organo-manganese phosphate sheets are stacked on top of each other and separated from each other by a single layer of water molecules; that is, the layer of water molecules is interspersed between the $Mn_3(PO_4)_4 \cdot 2(H_3NCH_2CH_2)_3N$ layers. When the compound is placed into liquid phase mixtures of certain molecules or mixture of molecules, preferential intercalation can occur, even at room temperature, with the composition of the present invention thereby acting as a separations material.

The as-synthesized manganese phosphate compound of the present invention is stable (that is, does not solubilize or otherwise break down) in aqueous solutions in the pH range of approximately 3.5 to approximately 9.5 and is entirely stable in non-aqueous solutions, including but not limited to pure and mixed alcohols, dioxanes, furans, glycols, ketones, xylenes, ethers, thiols, and amines. The compound is thermally stable at temperatures up to approximately 225° C. under air, oxygen, and inert atmospheres.

The structure was solved ab initio from powder x-ray diffraction data and the compound characterized by scanning electron microscopy, elemental analysis and thermal analysis. The compound was determined to crystallize in the trigonal space group P-3c1 with a=8.8706(4) Å, c=26.1580 (2) Å, and V (volume)=1783 Å$^3$. The structure consists of sheets of corner sharing Mn(II)O$_4$ and PO$_4$ tetrahedra with layers of TREN and water molecules in-between. The pronated TREN molecules provide charge balancing for the inorganic sheets. A network of hydrogen bonds between water molecules and the inorganic sheets holds the structure together.

The ab initio structure was determined from powder x-ray diffraction data with the positions of the first thirty-five peaks refined using a split Pearson VII function for the more asymmetric low angle peaks and a pseudo-Voigt function for the peaks above 15°. The peak positions were calibrated and the pattern indexed with good figures of merit. The refined lattice constants, as well as a summary of the crystallographic data, are given in Table 1. Table 2 shows atomic coordinates for non-hydrogen atoms for $Mn_3(PO_4)_4 \cdot 2(N_4C_6H_{21}) \cdot 6(H_2O)$.

TABLE 1

Crystal data and structure refinement parameters.

| | |
|---|---|
| Compound | $Mn_3(PO_4)_4 \cdot 2\ (N_4C_6H_{21}) \cdot 6\ (H_2O)$ |
| Chemical formula | $Mn_3P_4\ O_{22}N_8C_{12}H_{54}$ |
| Formula weight | 951.3 g/mole |
| Crystal system | Trigonal |
| Space group | P –3 c 1 (# 165) |
| Unit cell dimensions | a = 8.8706(4) Å |
| | c = 26.158(2) Å |
| Volume | 1782.6 Å$^3$ |
| Z | 2 |
| Density (measured) | 1.80(1) g/cm$^3$ |
| Density (calculated) | 1.77 g/cm$^3$ |
| F(000) | 986 |
| Temperature | 298(2) K |
| Wavelength | CuK$_{\alpha 1,\ \alpha 2}$ |
| 2θ range | 2.5 to 80.0° |

TABLE 2

Atomic coordinates and isotropic displacement parameters for not hydrogen atoms for $Mn_3(PO_4)_4 \cdot 2\ (N_4C_6H_{21}) \cdot 6\ (H_2O)$.

| Atom - Site | x | y | z |
|---|---|---|---|
| Mn - 6f | 0.7415(5) | 0 | ¼ |
| P1 - 4d | ⅓ | ⅔ | 0.2373(4) |
| P2 - 4c | 0 | 0 | 0.1681(3) |
| O1 - 4d | ⅓ | ⅔ | 0.2957(6) |
| O2 - 12g | 0.304(1) | 0.491(1) | 0.2231(4) |
| O3 - 12g | 0.184(1) | 0.094(1) | 0.1899(3) |
| O4 - 4c | 0 | 0 | 0.1082(6) |
| Ow - 12g | 0.149(1) | 0.252(1) | 0.0359(3) |
| N1 - 4d | ⅔ | ⅓ | 0.0832(7) |
| N2 - 12g | 0.440(2) | 0.022(2) | 0.1517(3) |
| C1 - 12g | 0.515(2) | 0.163(1) | 0.0673(4) |
| C2 - 12g | 0.495(2) | 0.010(2) | 0.0990(3) |

Isotropic Atomic Displacement Parameters: B(Mn) = 2.8(1) Å$^2$; B(P) = 2.9(1) Å$^2$; B(O) = 3.1(2) Å$^2$; B(Ow) = 3.1(3) Å$^2$; B(C) = B(N) = 3.5(2) Å$^2$.

Figure 2:
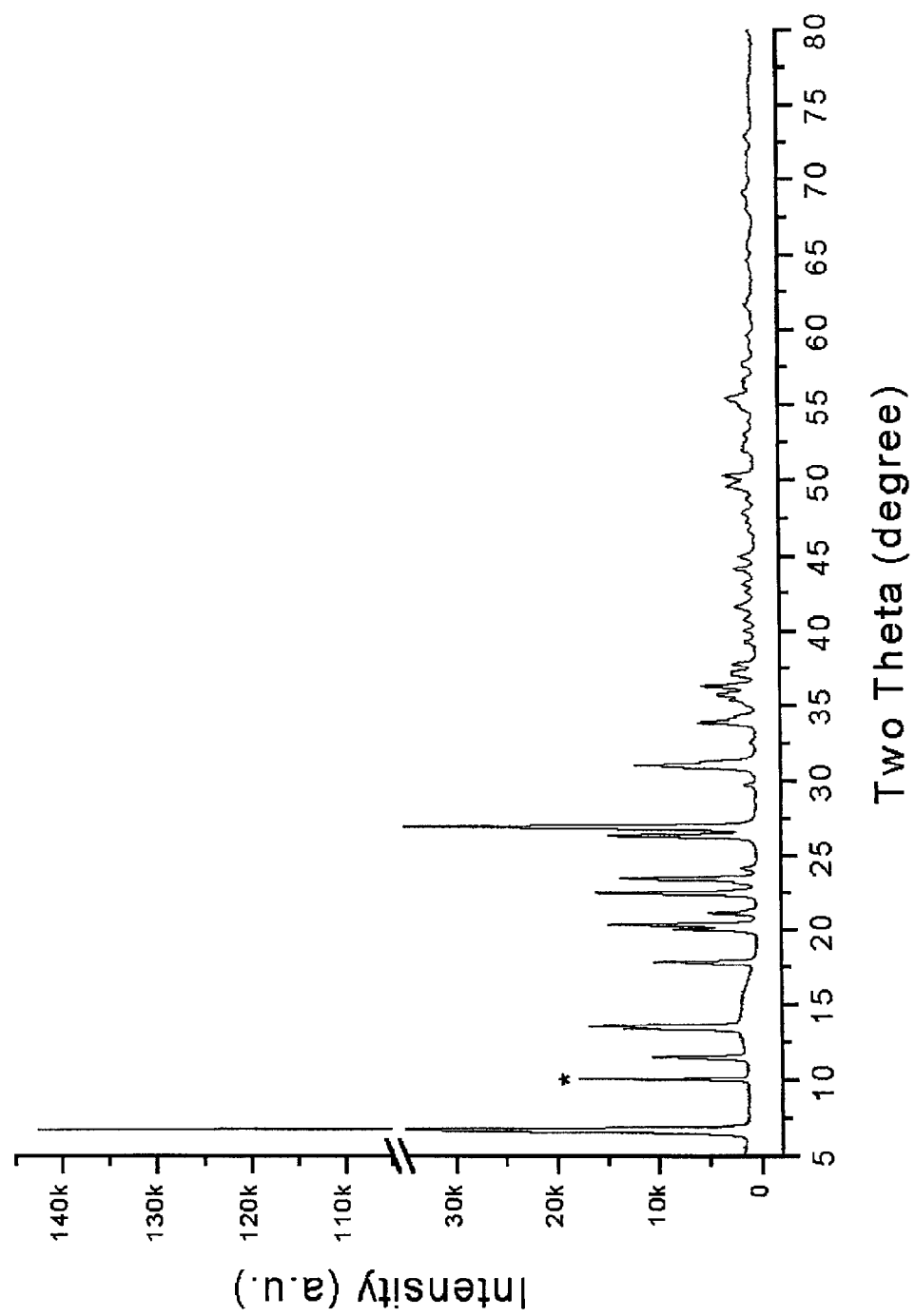
FIG. 2 shows an x-ray diffraction pattern of $Mn_3(PO_4)_4 \cdot 2(H_3NCH_2CH_2)_3N \cdot 6(H_2O)$.

The elemental chemical analysis gave the atomic ratio Mn/P=0.76. Thermo-gravimetric analysis showed a weight loss of 11.2 wt % below 200° C., attributed to water. With a measured density of 1.80(1) g/cm$^3$, the idealized composition was determined to be $Mn_3(PO_4)_4 \cdot 2(H_3NCH_2CH_2)_3 N.6(H_2O)$. FIG. 1 shows an illustration of the structure of the composition of the present invention. The x-ray diffraction pattern for this material is shown in FIG. 2.

In the method of the present invention, the manganese phosphate compound, $Mn_3(PO_4)_4 \cdot 2(H_3NCH_2CH_2)_3 N.6(H_2O)$, is dispersed into a liquid containing a mixture of polar organic compounds. The contact time can be from seconds to hours. The $Mn_3(PO_4)_4 \cdot 2(H_3NCH_2CH_2)_3 N.6(H_2O)$ compound preferentially adsorbs one type of molecule, via swelling of the layers, to accept into the interlayer space one type of molecule over another. Adsorption is reversed in seconds to hours at room temperature up to approximately 70° C. via evaporative desorption in most cases. The manganese phosphate compound exists as a microcrystalline powder, generally with crystals of size of approximately 10 to approximately 50 microns. The solid manganese phosphate compound with the selectively separated polar compound can be recovered by standard techniques, such as filtration or centrifugation followed by evaporation. Alternatively, the manganese phosphate compound can be put into an engineered material, such as formed as a granule or pelletized material, encapsulated into an inorganic or organic porous material, or attached to a substrate material so that the engineered material with the manganese phosphate material can contact a liquid solution.

In one embodiment, $Mn_3(PO_4)_4 \cdot 2(H_3NCH_2CH_2)_3 N.6 (H_2O)$ was contacted with a liquid mixture containing short carbon chain (one or two carbon atoms) polar compounds and longer carbon chain (between three to six or more carbon atoms) polar compounds. For example, approximately 0.1 gm of the solid manganese phosphate material was contacted with more than 2 gm of the liquid mixture for approximately 15 minutes. In one instance, the liquid mixture contained approximately equal amounts of methanol or ethanol with 1-propanol or hexanol; in another instance the liquid mixture contained approximately equal amounts of acetone and methyl ethyl ketone. (In most cases, the liquid mixture in the specified examples was a binary mixture containing approximately equal amounts of both compounds. However, the liquid mixture can be comprised of a varying number of compounds in varying concentrations. Compounds with concentrations as low as 1 wt % have been successfully separated from a liquid mixture.) The solid manganese phosphate material selectively separated the short carbon chain compounds from the longer chain carbon compounds, where the shorter chain compounds were intercalated into the manganese phosphate compound.

In another embodiment, $Mn_3(PO_4)_4 \cdot 2(H_3NCH_2CH_2)_3 N.6 (H_2O)$ was contacted with a liquid mixture containing linear carbon chain polar organic compounds and branched carbon chain polar compounds. For example, approximately 0.1 gm of the solid manganese phosphate material was contacted with more than 2 gm of the liquid mixture for approximately 15 minutes. In one instance, the liquid mixture contained methanol, ethanol or 1-propanol (a mixture of these can also be used) and 2-propanol. In another instance, the liquid mixture contained sec-butanol and tert-butanol. In yet another instance, the liquid mixture contained 1-butanol and sec-butanol. In all cases, the $Mn_3(PO_4)_4 \cdot 2(H_3NCH_2CH_2)_3 N.6(H_2O)$ compound successfully separated the most linear compounds from the closely related branched compounds by selectively intercalating the most linear compounds.

In another embodiment, $Mn_3(PO_4)_4 \cdot 2(H_3NCH_2CH_2)_3 N.6 (H_2O)$ was contacted with a liquid mixture containing water and polar organic compounds. For example, approximately 0.1 gm of the solid manganese phosphate material was contacted with more than 2 gm of the liquid mixture for approximately 15 minutes. Experiments were performed where various polar organic compounds, including ethanol, acetone, methyl ethyl ketone, ethylene glycol, tetrahydrofuran, pyridine, butylamine, thiophene, and methyl tert-butyl ether were intercalated into the $Mn_3 (PO_4)_4 \cdot 2(H_3NCH_2CH_2)_3 N.6(H_2O)$ compound to successfully separate them from the water molecules.

In another embodiment, $Mn_3(PO_4)_4 \cdot 2(H_3NCH_2CH_2)_3 N.6 (H_2O)$ was contacted with a liquid mixture containing polar organic compounds where the location of the polar group on the hydrocarbon chain varied. For example, approximately 0.1 gm of the solid manganese phosphate material was contacted with more than 2 gm of the liquid mixture for approximately 15 minutes. In one instance, the liquid mixture contained methyl amyl ketone and methyl ethyl ketone. The $Mn_3(PO_4)_4 \cdot 2(H_3NCH_2CH_2)_3 N.6(H_2O)$ compound selectively separated the two compounds from each other.

In another embodiment, $Mn_3(PO_4)_4 \cdot 2(H_3NCH_2CH_2)_3 N.6 (H_2O)$ was contacted with an aqueous mixture containing dissolved polar solids. For example, approximately 0.1 gm of the solid manganese phosphate material was contacted with more than 2 gm of the aqueous mixture for approximately 10 hours. In one instance, the aqueous mixture contained dissolved d-glucosamine. The $Mn_3(PO_4)_4 \cdot 2(H_3NCH_2CH_2)_3N \cdot 6(H_2O)$ compound selectively intercalated the d-glucosamine molecules.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for separating at least one polar organic compound from a liquid mixture of polar compounds comprising dispersing $Mn_3(PO_4)_4 \cdot 2(H_3NCH_2CH_2)_3N \cdot 6(H_2O)$ in said liquid mixture of polar compounds, wherein said $Mn_3(PO_4)_4 \cdot 2(H_3NCH_2CH_2)_3N \cdot 6(H_2O)$ selectively intercalates said at least one polar organic compound in preference to at least one other compound of said mixture of polar compounds.

2. The method of claim 1 wherein said $Mn_3(PO_4)_4 \cdot 2(H_3NCH_2CH_2)_3N \cdot 6(H_2O)$ is characterized by being crystallized in the trigonal space group P-3c1 with a=8.8706(4) Å and c=26.1580(2) Å.

3. The method of claim 1 wherein $Mn_3(PO_4)_4 \cdot 2(H_3NCH_2CH_2)_3N \cdot 6(H_2O)$ is dispersed as a powder.

4. The method of claim 3 wherein said powder comprises particles with diameters between approximately 10 microns and approximately 50 microns.

5. The method of claim 1 wherein said $Mn_3(PO_4)_4 \cdot 2(H_3NCH_2CH_2)_3N \cdot 6(H_2O)$ is dispersed as an engineered material, selected from the group consisting of a granule, a pelletized material, an organic porous material encapsulating $Mn_3(PO_4)_4 \cdot 2(H_3NCH_2CH_2)_3N \cdot 6(H_2O)$, an inorganic porous material encapsulating $Mn_3(PO_4)_4 \cdot 2(H_3NCH_2CH_2)_3N \cdot 6(H_2O)$, and a substrate material to which $Mn_3(PO_4)_4 \cdot 2(H_3NCH_2CH_2)_3N \cdot 6(H_2O)$ is attached.

6. The method of claim 5 wherein said at least one polar organic compound is removed from said $Mn_3(PO_4)_4 \cdot 2(H_3NCH_2CH_2)_3N \cdot 6(H_2O)$ by heating.

7. The method of claim 1 further comprising the step of separating said $Mn_3(PO_4)_4 \cdot 2(H_3NCH_2CH_2)_3N \cdot 6(H_2O)$ containing the selectively intercalated at least one polar organic compound from said liquid mixture.

8. The method of claim 1 wherein said liquid mixture comprises a mixture of polar organic compounds.

9. The method of claim 1 wherein said liquid mixture comprises polar organic compounds with linear carbon chains.

10. The method of claim 9 wherein said polar organic compounds with linear carbon chains have at least one carbon atom and less than seven carbon atoms.

11. The method of claim 10 wherein said polar organic compounds are selected from the group consisting of alcohols, ketones, and aldehydes.

12. The method of claim 1 wherein said liquid mixture comprises at least one linear carbon chain polar organic compound and at least one branched carbon chain polar organic compound.

13. The method of claim 12 wherein said at least one linear carbon chain polar organic compound and at least one branched carbon chain polar organic compound have at least one carbon atom and less than seven carbon atoms.

14. The method of claim 13 wherein said at least one linear carbon chain polar organic compound and at least one branched carbon chain polar organic compound are selected from the group consisting of alcohols, ketones, and aldehydes.

15. The method of claim 1 wherein said liquid mixture comprises water and at least one polar organic compound.

16. The method of claim 15 wherein said at least one polar organic compound is selected from alcohols, ketones, aldehydes, furans, and amines.

17. The method of claim 16 wherein said at least one polar organic compound is selected from ethanol, acetone, methyl ethyl ketone, ethylene glycol, tetrahydrofuran, pyridine, butylamine, thiophene, and methyl tert-butyl other.

18. The method of claim 1 wherein said liquid mixture comprises water and at least one dissolved polar solid.

19. The method of claim 18 wherein said polar solid is d-glucosamine.

* * * * *